May 23, 1933.  E. FERNHOLZ  1,910,283
CLOSING DEVICE FOR PRESSURE VESSELS
Filed June 6, 1932  2 Sheets-Sheet 1
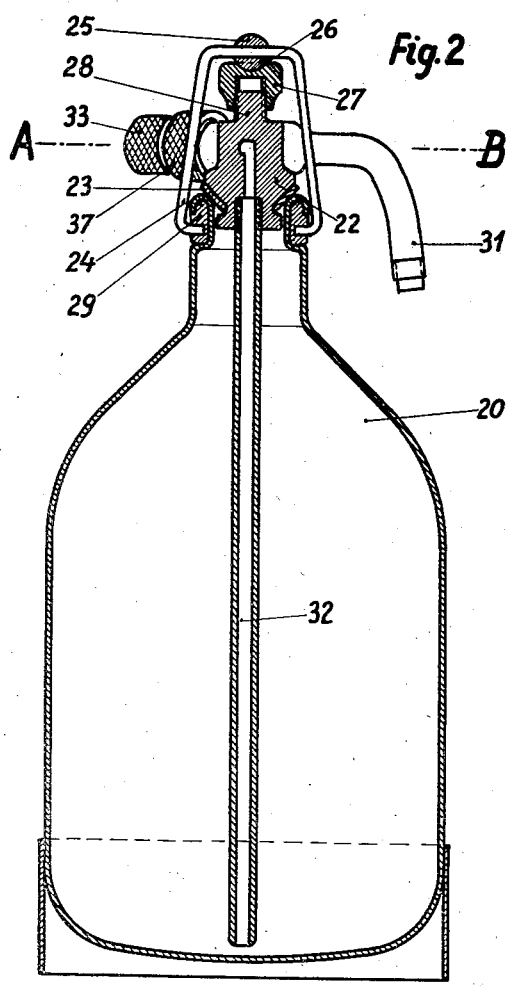
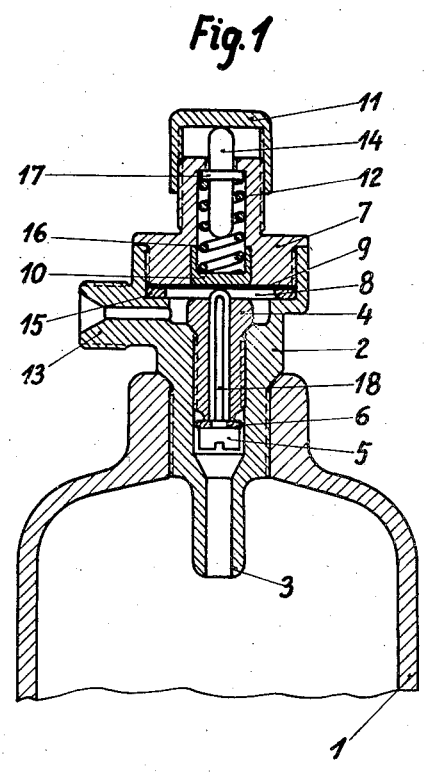
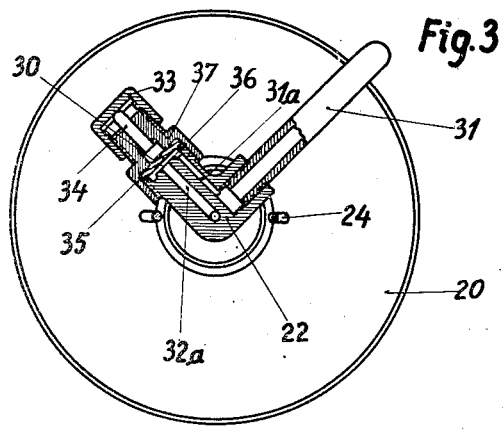

May 23, 1933.  E. FERNHOLZ  1,910,283
CLOSING DEVICE FOR PRESSURE VESSELS
Filed June 6, 1932  2 Sheets-Sheet 2
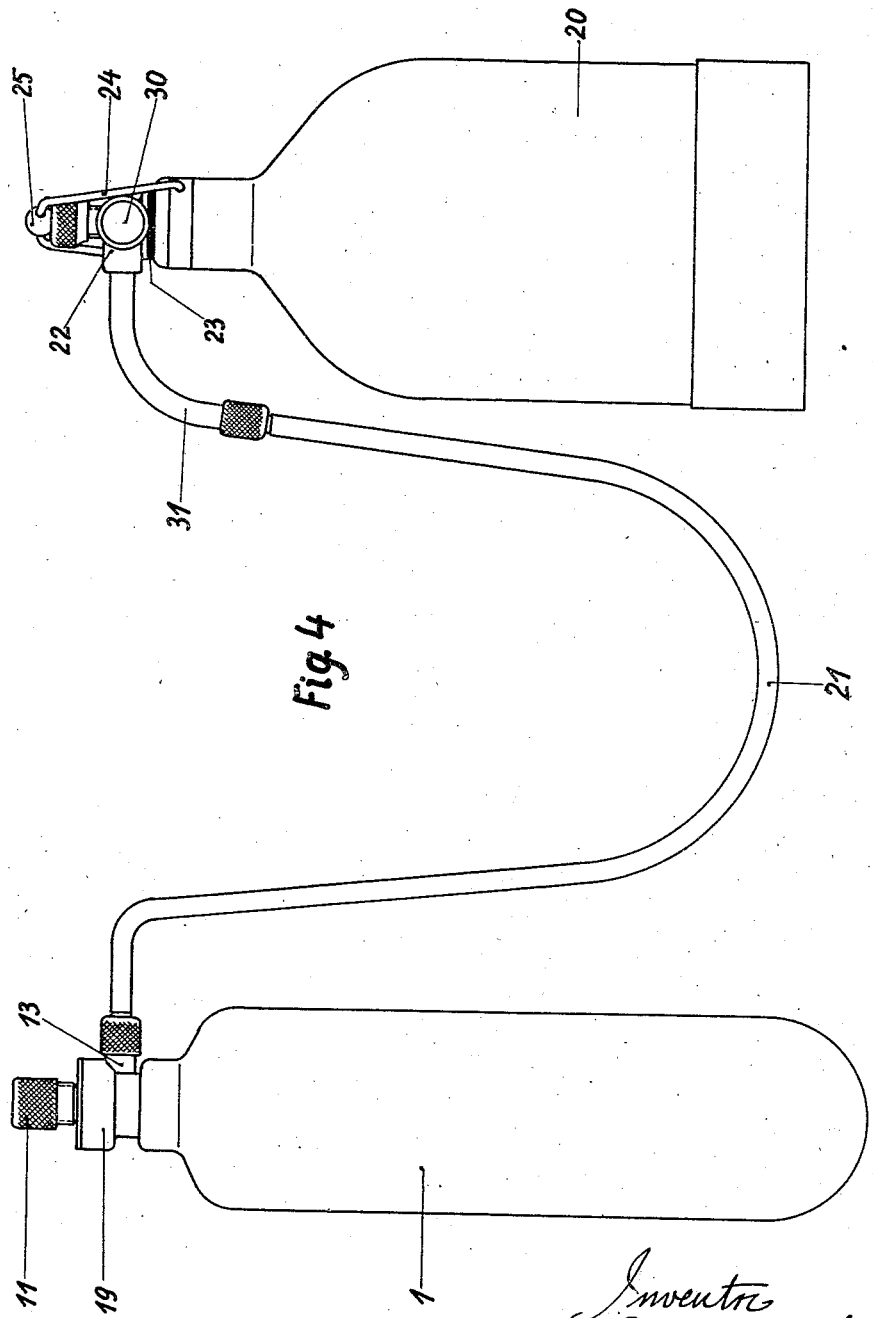

Patented May 23, 1933

1,910,283

UNITED STATES PATENT OFFICE

ERNST FERNHOLZ, OF BERLIN-TEMPELHOF, GERMANY

CLOSING DEVICE FOR PRESSURE VESSELS

Application filed June 6, 1932, Serial No. 615,627, and in Germany February 5, 1932.

This invention relates chiefly to closing devices for pressure vessels, particularly those employed in plants for the manufacture and discharge of carbonated beverages, though closing devices constructed according to the invention may be used also in connection with pressure vessels serving other purposes.

Vessels or containers hitherto employed for the storing of gases or liquids under high pressure were usually steel cylinders and provided with valves which permitted filling, closing and discharging under high pressure. If the contents of the vessel had to be discharged under reduced pressure a reducing valve was connected with the cylinder valve for adjusting working pressure at will, the reducing valve being fitted, as a rule, with two pressure gauges and a safety valve.

With respect to numerous uses the arrangement described, which is universally employed, suffers, however, from serious drawbacks which could not be eliminated until now. For example, the stuffing boxes of the cylinder valves are often leaky, and, since the point of juncture between the cylinder valve and the reducing valve is exposed to high pressure, it constitutes another source of losses. Furthermore, the arrangement is entirely too large, too unhandy, too heavy and too expensive for certain purposes, such as the production of carbonated beverages at home or for oxygen breathing and inhaling apparatus where the greatest possible saving in weight and space must be effected or for fire extinguishing outfits operated by carbonic acid in small bottles and required to be kept tight for years or for transporting living fish by means of oxygen where absolute tightness of the apparatus concerned is of utmost importance.

The invention eliminates all these defects by providing a closing device consisting of a valve for pressure vessels, particularly steel cylinders, which constitutes a combination of a cylinder and reducing valve and which may be used simultaneously for filling and closing the vessel and for discharging the contents of the vessel under full or reduced vessel pressure.
Another object of the invention is a plant for the production and discharge of carbonated beverages comprising a container for the beverages, a pressure cylinder filled with carbon-dioxide and a connecting conduit between the container and the cylinder, which may be attached and removed at will. The pressure cylinder is provided with the valve according to the invention, which simultaneously fulfills the function of the former cylinder and reducing valves.

A further object of the invention is the provision of a closing member and a valve for the beverage container of the plant for the production and discharge of carbonated beverages.

By way of example, the invention is illustrated in the accompanying drawings, in which Figure 1 is a vertical section of the upper portion of a pressure vessel and the closing device according to the invention which is screwed into the vessel; Fig. 2, a vertical section of the beverage container of a plant for the production and discharge of carbonated beverages, and of the closure of the container; Fig. 3, a section on the line A—B, of Fig. 2; and Fig. 4, a view of the entire plant for the production and discharge of carbonated beverages.

Referring to the drawings, into the neck of the steel cylinder 1 is screwed, with a conical packing, the casing 2 which carries the inlet and outlet 13 and has a pipe-like extension 3 projecting inside the cylinder for a distance amounting to a few centimeters. The extension 3 serves to prevent the entraining of rust particles or other impurities. A check valve 5 having a packing ring 6 is guided with its angular and slightly protruding shaft 18 in the bush 4 which is tightly screwed to the casing 2 containing the cover 7 screwed in so as to be high-pressure-proof and being limited downwardly by a collar. The casing 2 is provided with a chamber 8 which can be connected with the inside of the cylinder 1 by the check valve 5 and which opens into the inlet and outlet 13. One of the walls of the chamber 8 is formed by a thin steel diaphragm 9 which partly rests on a packing ring 15 and partly is in direct contact with the inside of the cover 7. The screwing depth of the cover 7 is chosen so that the ring 17 is compressed sufficiently to pack tightly and the diaphragm 9 will simultaneously be adjacent approximately to the projecting shank of the check valve 5. In the longitudinal bore of the cover 7 a spiral spring 12 is guided which carries on the inside the spring extremity shoe 10 and on the outside the pressure pin 14, the shoe 10 in the cover 7 being arranged so that one of its end faces is flush with the inner cover surface when its other end face firmly hugs the edge 16 in the cover 7. The pin 14 has a collar 17 and extends for a distance inside the spring 12 and, outwardly, beyond the cover 7 up to the bottom of the thrust screw 11.

The valve functions as follows:

During the filling of the steel cylinder the high pressure gas flows through the connection 13 into the chamber 8 and thence through the check valve 5, which offers no resistance in one direction of flow, into the cylinder 1. When the filling pressure ceases the cylinder pressure will automatically close the check valve 5 tightly and firmly. The thin diaphragm 9 cannot be damaged by high pressure during the filling operation, since it closely hugs the cover 7 and the spring shoe 10 and is thus not exposed to stresses. The packing of the casing 2 by the ring 15 cannot be interfered with by the high pressure which will press the ring only more tightly into its closed bearing. To preserve the packing ring 6 as long as possible the closed check valve 5 is not subjected to the full cylinder pressure. If soft rubber is used for instance for the valve size shown a load of a few kilos will suffice, the considerably higher residual load at full cylinder pressure being rendered harmless by supporting the check valve 5. In the embodiment illustrated the angular valve rod 18 will be supported by the diaphragm 9 already at a load of a few kilos and thus transmit the excess pressure to the firm cover 7.

If gas is to be taken out of the cylinder under constant reduced pressure, the thrust screw 11 is tightened to compress the spring 12 which with its shoe 10 presses against the diaphragm 9 which lifts the check valve 5 so that gas can flow out. When the pressure in the chamber 8 has reached a certain degree, the diaphragm 9 is, however, pressed back whereby the check valve 5 will be closed and the discharge of gas be stopped. The amount of this pressure depends on the tension of the spring 12, i. e., on the position of the thrust screw 11.

If gas is to be discharged under full cylinder pressure while, for example, being transferred from a larger container to smaller vessels, the thrust screw 11 is tightened until the pin 14 presses directly against the spring shoe 10 to eliminate the action of the spring 12. As the diaphragm 9 cannot be pressed back any more these circumstances, the check valve 5 will remain open even at full cylinder pressure in the casing 2 and permit the passage of the high pressure gas.

The closing valve according to the invention does not require a safety valve, since it is itself equipped for high pressure. The conduits are best protected by attached hose members which will slide off after a certain maximum pressure has been exceeded.

Fig. 4 shows a plant for the production and discharge of carbonated beverages, and comprises a steel cylinder fitted with the valve 19 just described, a pressure vessel 20 for the beverage and an easily attachable and removable connecting conduit 21 for the two vessels 1 and 20. Owing to the simple construction of the valve 19, which permits the filling and closing of the cylinder 1 as well as the removal of its contents under full or reduced pressure, the plant is cheap and easy to operate and therefore excellently adapted for home use and small-scale operation.

The container 20 is provided with a closing head 22 which is packed relative to the container opening by the ring 23. The member 22 is held in position by a movable strap 24 and a ball 25 adapted to be displaced on a straight portion of the strap 24 whereby closure resistant to pressure is insured. In closing position, the ball 25 rests in the concave bearing surface 26 of a nut 27 which is screwed on to a threaded pin 28 of the member 22. As the ball 25 is displaceable relative to the strap 24 and the latter is rotatably secured in the ring 29 vertically to the direction of motion of the ball 25, the combination of the two motions will compensate any inaccuracies in fitting the ball 25 and the surface 26 in any direction. If the nut 27 is screwed down, the strap 24, as shown in Fig. 2, may be moved towards the onlooker so as to permit the removal of the member 22 to fill the container 20 with the desired beverage.

The closing member 22 contains the shut-off valve 30 and the discharge pipe 31 which serves also as supply conduit for the carbonic acid gas. Liquid contained in the vessel 20 is, during the removal of carbonic acid gas, pressed through the riser 32 into the member 22 and thence through the valve 30 into the pipe 31.

The valve 30 is shut off by turning the nut 33 whereby the valve rod 34 is caused to press the elastic diaphragm 35, which may consist of rubber, on to the seat 36 which contains the openings of the conduit 32a communicating with the riser 32 and of the conduit 31a communicating with the pipe 31. The diaphragm 35 is secured in the member 22 by the cap nut 37 serving also as guide for the rod 34 and for fastening the nut 33.

After the nut 33 has been unscrewed the liquid or gas will press against the diaphragm 35 which presses against the valve rod 34 so that the latter presses outwardly against the nut 33 until a projection of the rod 34 hugs a corresponding face of the cap nut 37.

The pressure vessel 20 and the closing member 22 as well as the parts connected therewith consist preferably of oxidized aluminum.

I claim:—

1. A device on pressure vessels, particularly steel cylinders, adapted to close the vessel and to permit the filling of it and the discharge of its contents at full or reduced pressure, comprising a casing with a chamber and a check valve connecting the chamber with the inside of the vessel, one wall of the chamber consisting of a diaphragm connected, on one side, with the check valve and adapted to open the valve and, on the other side, hugging a supporting face and adapted to be loaded by an adjustable spring, the chamber opening into an inlet and outlet.

2. A device on pressure vessels, particularly steel cylinders, adapted to close the vessel and to permit the filling of it and the discharge of its contents at full or reduced pressure, comprising a casing with a cover that can be screwed in up to a stop, a chamber and a check valve connecting the chamber with the inside of the vessel, one wall of the chamber consisting of a diaphragm connected, on one side, with the check valve and adapted to open the valve, and, on the other side, hugging the cover of the casing and adapted to be loaded by an adjustable spring, a packing ring between the diaphragm and the opposite wall of the chamber, the chamber opening into an inlet and outlet.

3. A device on pressure vessels, particularly steel cylinders, adapted to close the vessel and to permit the filling of it and the discharge of its contents at full or reduced pressure, comprising a casing with a screw-in cover, a chamber opening into an outlet and a check valve connecting the chamber with the inside of the vessel, one wall of the chamber consisting of a diaphragm connected, on one side, with the check valve and adapted to open the valve and, on the other side, hugging the cover of the casing, the cover containing a spring, a shoe in contact with the diaphragm and surrounding the lower end of the said spring, and a screw adapted to compress the said spring.

4. A device on pressure vessels, particularly steel cylinders, adapted to close the vessel and to permit the filling of it and the discharge of its contents at full or reduced pressure, comprising a casing with a screw-in cover, a chamber opening into an outlet and a check valve connecting the chamber with the inside of the vessel, one wall of the chamber consisting of a diaphragm connected, on one side, with the check valve and adapted to open the valve and, on the other side, hugging the cover of the casing, the casing containing a spring, a shoe in contact with the diaphragm and surrounding the lower end of the said spring, a bolt within the spring and resting with a stop partly on the upper end of the said spring and partly on a collar of the cover, and a screw adapted to displace the said bolt and thus to tension the spring.

5. A device on pressure vessels, particularly steel cylinders, adapted to close the vessel and to permit the filling of it and the discharge of its contents at full or reduced pressure, comprising a casing with a screw-in cover, a chamber opening into an outlet and a check valve connecting the chamber with the inside of the vessel, one wall of the chamber consisting of a diaphragm connected, on one side, with the check valve and adapted to open the valve and, on the other side, hugging the cover of the casing, the cover containing a spring, a shoe in contact with the diaphragm and surrounding the lower end of the said spring, a bolt inside the spring and resting with a stop partly on the upper end of the said spring and partly on a collar of the cover, a screw adapted to displace the said bolt and thus tension the spring, the bolt being of such a length as to strike the said shoe and to displace it directly after the spring has been tensioned to a predetermined degree.

6. A device on pressure vessels, particularly steel cylinders, adapted to close the vessel and to permit the filling of it and the discharge of its contents at full or reduced pressure, comprising a casing with a chamber opening into an inlet and outlet, a check valve connecting the chamber with the inside of the vessel, and a pipe connection extending into the vessel and leading to the said check valve, one wall of the chamber consisting of a diaphragm connected, on one side, with the check valve and adapted to open the valve, and, on the other side, hugging a supporting surface and adapted to be loaded by an adjustable spring.

7. A plant for the production and discharge of carbonated beverages comprising, in combination, a beverage container with a closing valve, a pressure cylinder filled with carbonic acid and a connectable and removable conduit between the beverage container and the pressure cylinder, the pressure cylinder being provided with a device adapted to close the pressure cylinder and to permit the filling of the pressure cylinder and the discharge of the contents thereof at full or reduced pressure, the device consisting of a casing with a chamber opening into the inlet and outlet and a check valve connecting the chamber with the inside of the cylinder, one wall of the chamber consisting of a diaphragm connected, on one side, with the check valve and adapted to open the valve and, on the other side, hugging a supporting surface and adapted to be loaded by an adjustable spring.

8. A plant for the production and discharge of carbonated beverages, comprising, in combination, a beverage container with a closing valve, a pressure cylinder filled with carbonic acid and a connectable and removable conduit between the beverage container and the pressure cylinder, the closing valve of the said beverage container being disposed in a removable closing head held in position by a movable strap secured to the beverage container, the strap having a straight portion with a ball displaceable thereon and the closing head carrying an adjustable nut having a bearing surface for the said ball on the straight portion of the strap.

9. A plant for the production and discharge of carbonated beverages, comprising, in combination, a beverage container with a closing valve, a pressure cylinder filled with carbonic acid and a connectable and removable conduit between the beverage container and the pressure cylinder, the closing valve of the said beverage container consisting of a disc made of elastic material and hugging on one side a seat and a displaceable pressure member and on the other side a seat face containing openings of the conduit leading into the beverage container and of the conduit leading to an inlet and outlet connection.

In testimony whereof I affix my signature.

ERNST FERNHOLZ.